(12) United States Patent
Huang

(10) Patent No.: US 8,967,882 B2
(45) Date of Patent: Mar. 3, 2015

(54) OPTICAL FIBER CONNECTOR

(71) Applicant: Hon Hai Precision Industry Co., Ltd., New Taipei (TW)

(72) Inventor: Po-Wei Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/967,356

(22) Filed: Aug. 15, 2013

(65) Prior Publication Data

US 2014/0185994 A1 Jul. 3, 2014

(30) Foreign Application Priority Data

Dec. 28, 2012 (TW) .............................. 101150759 A

(51) Int. Cl.
  *G02B 6/36* (2006.01)
  *G02B 6/38* (2006.01)

(52) U.S. Cl.
  CPC ............ *G02B 6/3839* (2013.01); *G02B 6/3885* (2013.01); *G02B 6/3652* (2013.01); *G02B 6/3853* (2013.01)
  USPC .................................. 385/89; 385/93; 385/65

(58) Field of Classification Search
  CPC ... G02B 6/3885; G02B 6/3652; G02B 6/3853
  USPC .............................. 385/24, 59–61, 88–93, 65
  See application file for complete search history.

(56) References Cited

U.S. PATENT DOCUMENTS

| | | | |
|---|---|---|---|
| 4,678,264 A * | 7/1987 | Bowen et al. ................... | 385/89 |
| 5,592,323 A * | 1/1997 | Wolter et al. .................. | 398/200 |
| 7,090,509 B1 * | 8/2006 | Gilliland et al. ............. | 439/76.1 |
| 7,108,431 B2 * | 9/2006 | Yang et al. ........................ | 385/78 |
| 7,156,688 B2 * | 1/2007 | Nakano et al. ................ | 439/417 |
| 7,234,876 B2 * | 6/2007 | Ohtsu et al. ..................... | 385/59 |
| 8,616,781 B2 * | 12/2013 | Knapp ............................. | 385/61 |
| 2002/0168150 A1 * | 11/2002 | Shiino et al. .................... | 385/71 |
| 2004/0057671 A1 * | 3/2004 | Kang et al. ...................... | 385/71 |
| 2010/0232751 A1 * | 9/2010 | Biwa et al. ...................... | 385/93 |
| 2013/0301995 A1 * | 11/2013 | Thome ............................. | 385/79 |

* cited by examiner

*Primary Examiner* — Ellen Kim
(74) *Attorney, Agent, or Firm* — Novak Druce Connolly Bove + Quigg LLP

(57) ABSTRACT

An optical fiber connector for positioning a number of optical fibers is provided. The optical fiber connector includes an assembling portion and a number of guiding blocks protruding from the assembling portion. The assembling portion defines a number of positioning holes corresponding to the optical fibers in position. The guiding blocks and the positioning holes are alternatively arranged on the assembling portion. Each guiding block includes a wedge portion at an end away from the assembling portion for guiding a corresponding one of the optical fibers into a corresponding one of the positioning holes.

9 Claims, 3 Drawing Sheets

OPTICAL FIBER CONNECTOR

BACKGROUND

1. Technical Field

The present disclosure relates to connectors, and particularly to a connector for optical fibers.

2. Description of Related Art

Optical fiber connectors may define a positioning hole for receiving an optical fiber. An end of the optical fiber is inserted into the positioning hole and is fixed in the positioning hole using adhesive. However, dimensions of the optical fibers and the positioning hole are very small. Therefore, it is difficult to insert the end of the optical fiber into the positioning hole and an end surface of the optical fiber is easily damaged during the assembling process, which may degrade quality of the optical connector.

Therefore, what is needed is an optical fiber connector addressing the limitations described.

BRIEF DESCRIPTION OF THE DRAWINGS

The components of the drawings are not necessarily drawn to scale, the emphasis instead being placed upon clearly illustrating the principles of the embodiments of the present disclosure. Moreover, in the drawings, like reference numerals designate corresponding parts throughout several views.

DETAILED DESCRIPTION

Figure 1:
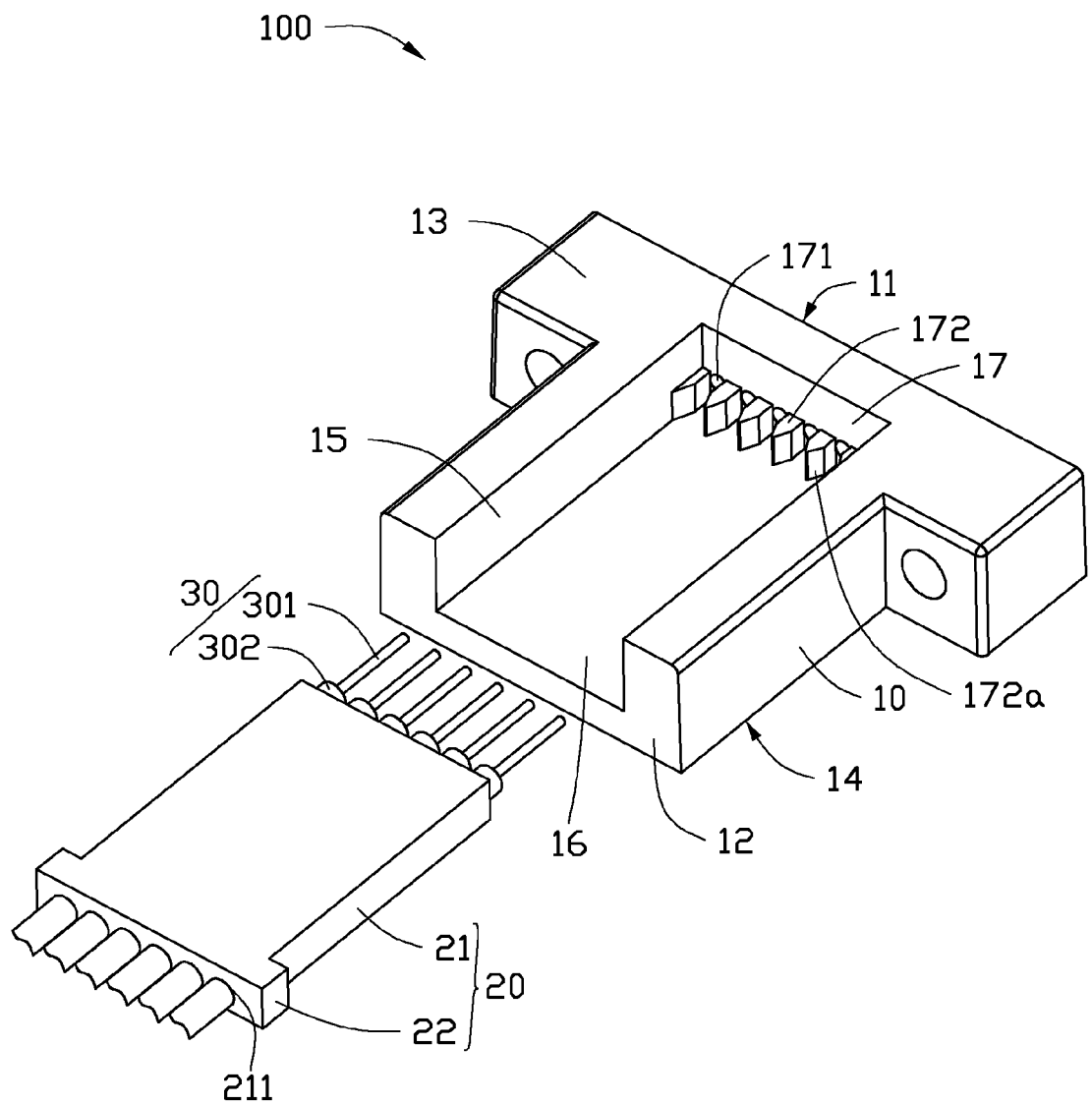
FIG. 1 is an exploded view of an optical fiber connector according to one embodiment.
Figure 2:
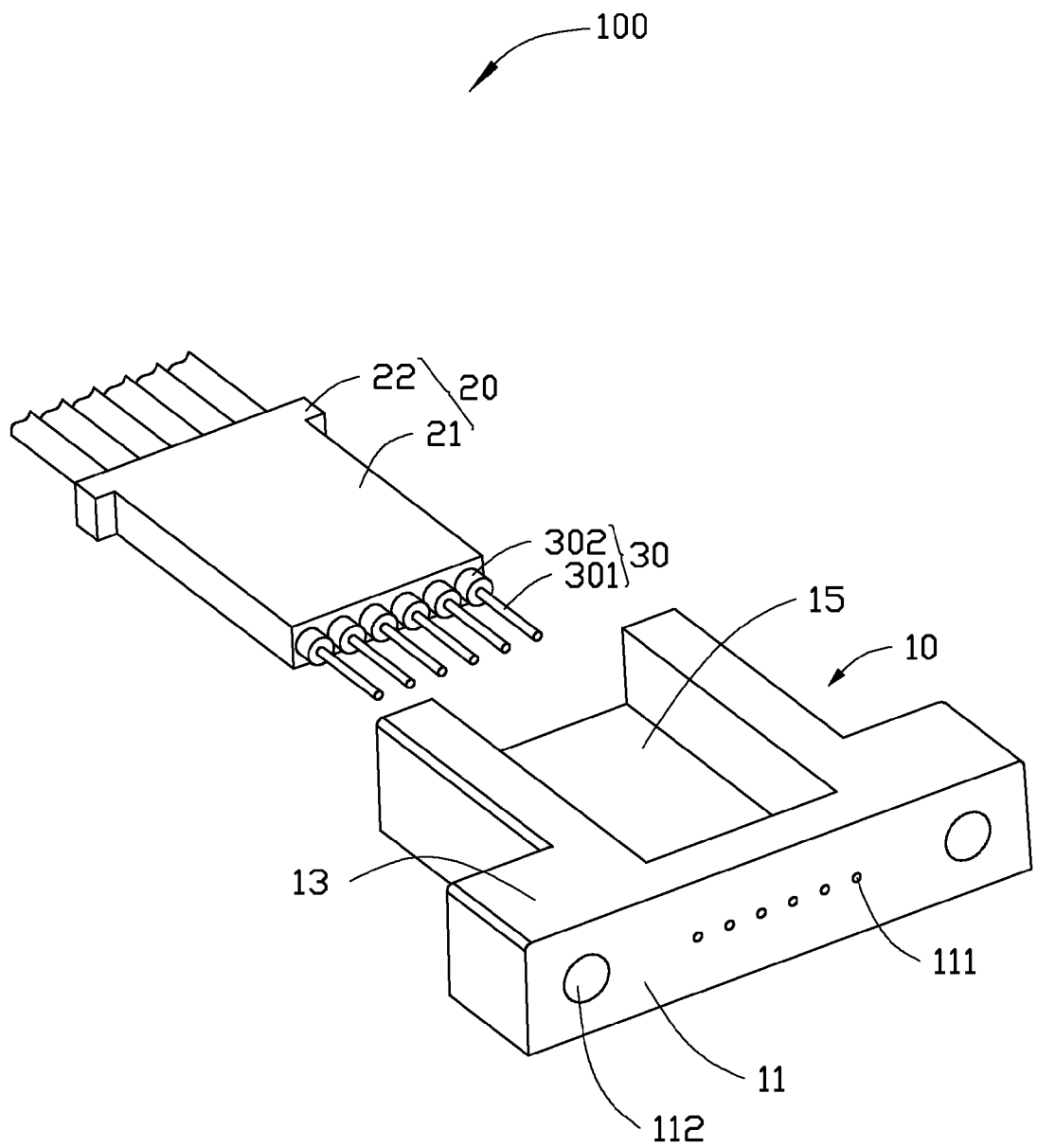
FIG. 2 is similar to FIG. 1, but shows the optical fiber connector from another angle.

FIGS. 1-2 show one embodiment of an optical fiber connector 100 configured for positioning a number of optical fibers 30 therein. The optical fiber connector 100 includes an assembling portion 10 and a positioning block 20.

The assembling portion 10 includes a first end surface 11, a second end surface 12 opposite to the first end surface 11, a top surface 13, and a bottom surface 14 opposite to the top surface 13. In this embodiment, the first end surface 11 and the second end surface 12 are substantially parallel to each other, the top surface 13 and the bottom surface 14 are substantially parallel to each other, and the first and second end surfaces 11, 13 are substantially perpendicular to the top surface 13 and the bottom surface 14.

The assembling portion 10 includes a number of lenses 111 formed on the first end surface 11. The lenses 111 are corresponding to the optical fibers 30 in position and configured for converging optical signals. The lenses 111 are arranged along a linear direction substantially parallel to the top surface 13. In this embodiment, the lenses 111 are aspheric convex lenses. The assembling portion 10 defines two inserting holes 112 in the first end surface 11. The inserting holes 112 are configured for engaging with a mated connector (not shown). In this embodiment, the inserting holes 112 are positioned at two opposite ends of the lens portions 111. Alternatively, the inserting holes 112 may be replaced by posts, and inserting holes may be defined in the mated connector.

The assembling portion 10 defines an assembling recess 15 in the top surface 13. The assembling recess 15 passes through the second end surface 12. The assembling recess 15 includes a bottom assembling surface 16 substantially parallel to the top surface 13 and an end assembling surface 17 substantially parallel to the first end surface 11. In this embodiment, the assembling recess 15 is substantially rectangular-shaped. The assembling portion 10 defines a number of positioning holes 171 in the end assembling surface 17. The positioning holes 171 are corresponding to the lenses 111 in position, and each positioning hole 171 is aligned with a corresponding lens 111. The assembling portion 10 further includes a number of guiding blocks 172 protruding from the end assembling surface 17. The guiding blocks 172 and the positioning holes 171 are alternatively arranged along a linear direction. A number of the guiding blocks 172 is one more than that of the positioning holes 171, thus each positioning hole 171 is sandwiched between two neighboring guiding blocks 172. The guiding blocks 172 perpendicularly protrude from the end assembling surface 17 towards the second end surface 12. Each guiding block 172 includes a wedge portion 172a at an end away from the end assembling surface 17. The wedge portions 172a of any two neighboring guiding blocks 172 define a bell-mouthed portion, the bell-mouthed portion can be used to guide an end of a corresponding optical fiber 30 into a corresponding positioning hole 171. A protruding distance of one of the guiding blocks 172 is larger than those of others. In this embodiment, the protruding distance of each guiding block 172 is different from others, in detail, the protruding distances of the guiding blocks 172 gradually increase or decrease along an arrangement direction of the guiding blocks 172.

The positioning block 20 includes a main body 21 and two resisting blocks 22 respectively formed at two opposite sides of the main body 21. A shape and size of the main body 21 are substantially the same as those of the assembling recess 15. The main body 21 defines a number of through holes 211 corresponding to the optical fibers 30 in position. The through holes 211 pass through two opposite side surfaces of the main body 21. The through holes 211 are substantially parallel to each other.

Each optical fiber 30 includes a fiber core 301 and a protection layer 302 surrounding a portion of the fiber core 302. The fiber core 301 is configured for transmitting optical signals, and the protection layer 302 is configured for protecting the fiber core 301 from being damaged. A portion of the fiber core 301 extends out of the protection layer 302.

Figure 3:
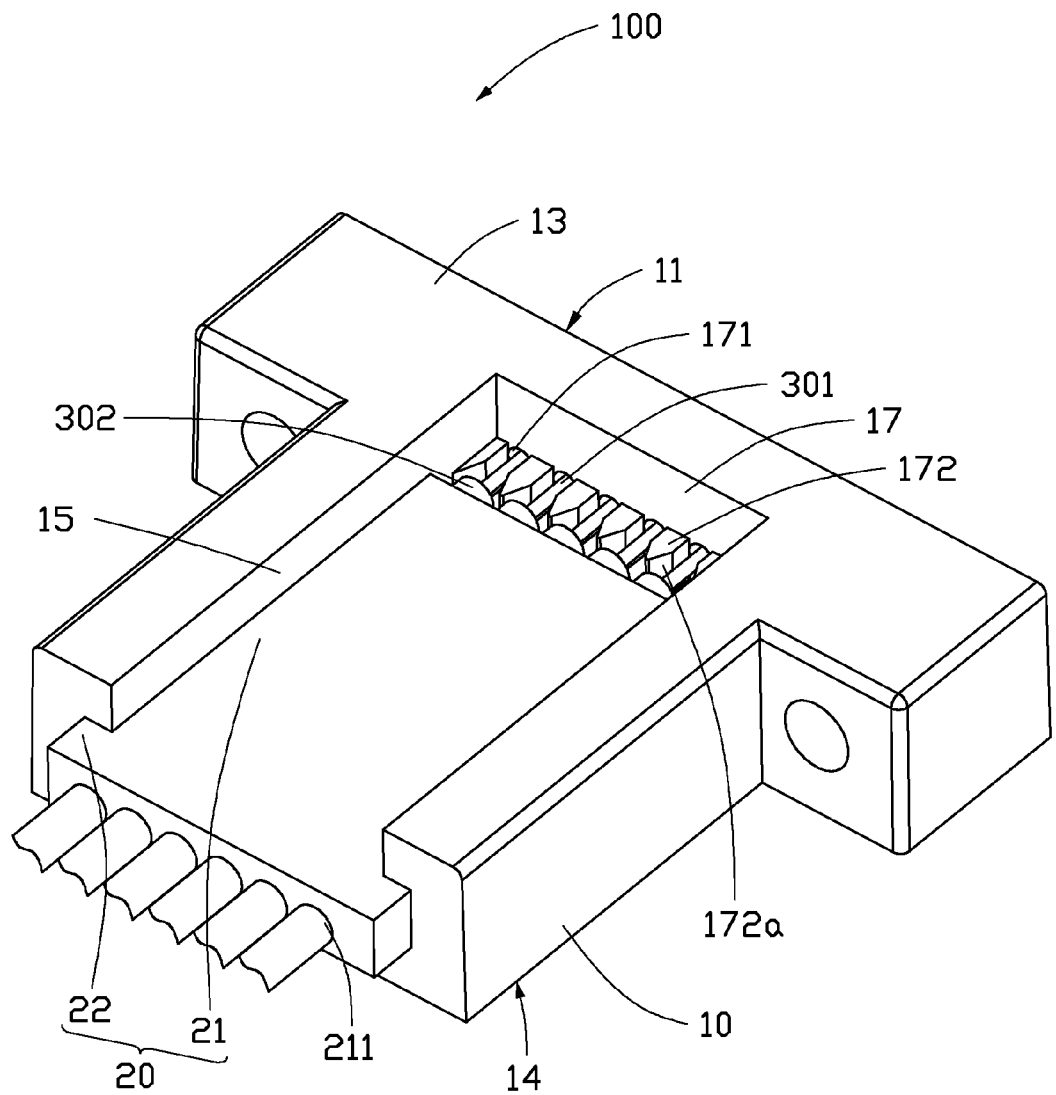
FIG. 3 is an assembled, isometric view of the optical fiber connector of FIG. 1.

FIG. 3 shows that in assembly, each optical fiber 30 is received by a corresponding through hole 211, and the exposed portion of the fiber core 31 extends out of the through hole 211. The positioning block 20 is assembled into the assembling recess 15. The exposed portion of each fiber core 31 is inserted into a corresponding positioning hole 171. Because the assembling recess 15 passes through the second end surface 21, the positioning block 20 can be assembled into the assembling recess 15 by sliding, thus an assembling stability of the positioning block 20 is ensured. During the assembly of the positioning block 20, the guiding blocks 172 can guide the fiber cores 31 into the corresponding positioning holes 171, which make a positioning process of the fiber cores 21 easier and enhance an efficiency of the positioning process. Because one of the guiding blocks 172 has a largest protruding distance, in the assembly of the positioning block 20, if the guiding block 172 is contacted with a corresponding optical fiber 30, an assembling position of the positioning block 20 relative to the assembling portion 10 can be adjusted to avoid contact between other optical fibers 30 and other guiding blocks 172. Therefore, an optical quality of the optical fiber connector 100 can be ensured. When the assembling portion 10 is assembled to a predetermined position, the resisting blocks 22 abut on the second end surface 12, the assembling portion 10 cannot be slid again, thus an assembling precision of the optical fiber connector 100 can be ensured.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An optical fiber connector for positioning a plurality of optical fibers, comprising:
    an assembling portion, the assembling portion defining a plurality of positioning holes corresponding to the optical fibers in position; and
    a plurality of guiding blocks protruding from the assembling portion, the guiding blocks and the positioning holes being alternatively arranged on the assembling portion, each guiding block comprising a wedge portion at an end away from the assembling portion for guiding a corresponding one of the optical fibers into a one of the corresponding positioning holes, and a number of the guiding blocks being one more than a number of the positioning holes.

2. The optical fiber connector of claim 1, wherein the assembling portion comprises a plurality of lenses corresponding to the positioning holes in position, each lens is aligned with a corresponding one of the positioning holes.

3. The optical fiber connector of claim 1, wherein a protruding distance of one of the guiding blocks is larger than those of others.

4. The optical fiber connector of claim 3, wherein the protruding distance of each guiding block is difference from others.

5. The optical fiber connector of claim 4, wherein the protruding distances of the guiding blocks gradually increase along an arrangement direction of the guiding blocks.

6. The optical fiber connector of claim 1, wherein the optical fiber connector comprises an positioning block for holding the optical fibers thereon, the assembling portion defines an assembling recess receiving the positioning block, the positioning holes are defined in an inner side surface of the assembling recess.

7. The optical fiber connector of claim 6, wherein the positioning block comprises a main body, the main body defines a plurality of through holes corresponding to the optical fibers in position, and the optical fibers pass through and are fixed in the through holes, respectively.

8. The optical fiber connector of claim 7, wherein the through holes are substantially parallel to each other.

9. The optical fiber connector of claim 6, wherein the positioning block comprises two resisting blocks respectively formed at two opposite sides of the main body, the resisting blocks abut on a side surface of the assembling portion when the positioning block is received into a predetermined assembling position of the assembling recess.

\* \* \* \* \*